United States Patent
Cornu et al.

(10) Patent No.: US 9,304,032 B2
(45) Date of Patent: Apr. 5, 2016

(54) HOLLOW PROFILE FOR A WEIGHT-IN-MOTION SENSOR

(71) Applicant: KISTLER HOLDING AG, Winterthur (CH)

(72) Inventors: David Cornu, Bellinzona (CH); Adrian Hofmann, Ellikon Am Rhein (CH)

(73) Assignee: KISTLER HOLDING AG, Winterthur (CH)

(*) Notice: Subject to any disclaimer, the term of this patent is extended or adjusted under 35 U.S.C. 154(b) by 47 days.

(21) Appl. No.: 14/356,244

(22) PCT Filed: Nov. 15, 2012

(86) PCT No.: PCT/CH2012/000251
§ 371 (c)(1),
(2) Date: May 5, 2014

(87) PCT Pub. No.: WO2013/071452
PCT Pub. Date: May 23, 2013

(65) Prior Publication Data
US 2015/0075297 A1    Mar. 19, 2015

(30) Foreign Application Priority Data
Nov. 18, 2011   (CH) .................................... 1846/11

(51) Int. Cl.
*G01L 1/04*     (2006.01)
*G01G 21/14*    (2006.01)
(Continued)

(52) U.S. Cl.
CPC ................. *G01G 21/14* (2013.01); *G01G 3/13* (2013.01); *G01G 19/024* (2013.01); *G01L 1/04* (2013.01)

(58) Field of Classification Search
CPC ....... G01G 21/14; G01G 3/13; G01G 19/024; G01L 1/04
USPC ..................... 73/818, 768, 862.642
See application file for complete search history.

(56) References Cited

U.S. PATENT DOCUMENTS

| 4,597,151 A | 7/1986 | Zaghi et al. |
| 5,265,481 A | 11/1993 | Sonderegger et al. |

(Continued)

FOREIGN PATENT DOCUMENTS

| CH | 394637 | 6/1965 |
| CH | 702257 | 5/2011 |

(Continued)

OTHER PUBLICATIONS

International Preliminary Report on Patentability for PCT/CH2012/000251, issued May 20, 2014.

(Continued)

*Primary Examiner* — Max Noori
(74) *Attorney, Agent, or Firm* — Dority & Manning, P.A.

(57) ABSTRACT

A WIM (weigh-in-motion) sensor has an oblong hollow profile and includes two force-transmission plates arranged parallel to each other. A tube is arranged between the plates and is integrally formed with the plates and defines a hollow space. Two supports that are arranged opposite one another are formed inside the hollow space, each support extending away from a respective plate and between which a measuring element is received centrally in the tube under preload. The tube includes two tube segments designed to be mirror-symmetrical with respect to each other, which join the plates together and on the inside adjoin the hollow space. The wall thickness of each tube segment has a relatively thick region between at least two relatively thin regions.

20 Claims, 3 Drawing Sheets

(51) Int. Cl.
*G01G 3/13* (2006.01)
*G01G 19/02* (2006.01)

(56) References Cited

U.S. PATENT DOCUMENTS

| | | |
|---|---|---|
| 5,345,428 A | 9/1994 | Arnold et al. |
| 5,461,924 A * | 10/1995 | Calderara ............... G01G 3/13 73/768 |
| 5,501,111 A | 3/1996 | Sonderegger et al. |
| 5,520,056 A * | 5/1996 | Buisson ................ G08G 1/02 340/933 |
| D370,423 S | 6/1996 | Nagai et al. |
| D370,424 S | 6/1996 | Nagai et al. |
| D373,738 S | 9/1996 | Nagai et al. |
| D386,431 S | 11/1997 | Nagai et al. |
| D386,702 S | 11/1997 | Nagai et al. |
| 5,717,390 A | 2/1998 | Hasselbring |
| 5,942,681 A | 8/1999 | Vollenweider et al. |
| 6,459,050 B1 | 10/2002 | Muhs |
| D469,886 S | 2/2003 | Barnett |
| 6,595,064 B2 | 7/2003 | Drewes et al. |
| D550,861 S | 9/2007 | Brabeck et al. |
| 7,423,225 B1 | 9/2008 | Kroll et al. |
| D684,075 S | 6/2013 | Cornu |
| D686,928 S | 7/2013 | Cornu |
| 2002/0014124 A1 | 2/2002 | Drewes et al. |
| 2006/0137914 A1 * | 6/2006 | Hodac ................. G01G 19/024 177/132 |
| 2011/0232974 A1 | 9/2011 | Abercrombie et al. |
| 2014/0124499 A1 * | 5/2014 | Wei ......................... H05B 3/24 219/541 |

FOREIGN PATENT DOCUMENTS

| | | |
|---|---|---|
| EP | 0259523 | 3/1988 |
| EP | 0491655 | 6/1992 |
| EP | 0 654 654 | 4/1995 |
| EP | 0 892 259 | 1/1999 |
| WO | WO 01/22044 A1 | 3/2001 |
| WO | 02/08712 | 1/2002 |
| WO | 03/071242 | 8/2003 |

OTHER PUBLICATIONS

International Search Report for PCT/CH2013/000005, issued Feb. 11, 2013.
International Preliminary Report on patentability for PCT/CH2012/000149, issued Jan. 7, 2014.
International Search Report on Patentability for PCT/CH2012/000134, issued Jul. 31, 2012.
International Preliminart Report on Patentability and Written Opinion for PCT/CH2012/000247, dated May 6, 2014.
International Search Report, issued Mar. 13, 2013.
J. Boby, S. Teral, J.M. Caussignac and M. Siffert, "Vehicle Weighing in Motion with Fibre Optic Sensors", pp. 45-47, Measurement + control, vol. 26, Mar. 1993.

* cited by examiner

HOLLOW PROFILE FOR A WEIGHT-IN-MOTION SENSOR

CROSS-REFERENCE TO RELATED APPLICATIONS

This application claims priority to International Application Serial No. PCT/CH2012/000251, filed Nov. 15, 2012, which claims priority to Swiss Application No. 1846/11 filed Nov. 18, 2011. International Application Serial No. PCT/CH2012/000251 is hereby incorporated herein for all purposes by this reference.

FIELD OF THE INVENTION

The invention relates to an oblong hollow profile for a WIM (weigh in motion) sensor, comprising two force-transmission plates arranged parallel to each other and a tube arranged between said plates and integrally formed with the plates and forming a hollow space, wherein two supports that are arranged opposite one another are formed inside the hollow space, each one extending away from a respective plate, between which supports a measuring element can be received centrally in the tube under preload, and wherein the tube comprises two tube segments designed to be mirror-symmetrical with respect to each other and which join the plates together and on the inside adjoin the hollow space.

BACKGROUND

WIM sensors are sensors that are between one and several meters in length that are installed in a roadway in order to measure the dynamic ground reaction forces of vehicles in order to, from this, determine the weight of said vehicles. The aluminium hollow profile into which a measuring element is installed under preload forms a significant element of the sensor. In this arrangement, supports that are provided for this at the top and at the bottom ensure optimum force flow through the measuring element. The hollow profile comprises a tube part that is responsible for preloading and sealing the measuring element. A known hollow profile for such purposes is, for example, described in U.S. Pat. No. 5,501,111, which is hereby incorporated herein in its entirety by this reference for all purposes. This design comprises a tube with a circular or hexagonal outer diameter and an inner hollow space that laterally, transversely to the direction of force transmission, is surrounded by uniform wall thicknesses and in the directions in which force transmission takes place on the inside comprises parallel surfaces for the purpose of clamping measuring elements. Such systems have shown to be less suitable because the force transmission from the outside to the tube can be controlled only inaccurately.

A further known hollow profile for such purposes is, for example, described in U.S. Pat. No. 5,461,924, which is hereby incorporated herein in its entirety for all purposes by this reference. As an expansion when compared to the embodiment according to U.S. Pat. No. 5,501,111 the embodiment according to U.S. Pat. No. 5,461,924 comprises two force-transmission plates between which the tube is affixed. Since these parallel force-transmission plates are a little more than twice as wide as the tube, the inward transmission force is well defined in this arrangement. A plurality of measuring elements that are preloaded by the tube receive the corresponding signals when a vehicle drives over the device.

FIG. 1 shows a cross section of a hollow profile 1 of a weigh in motion (WIM) sensor according to the state of the art. As a rule the width and height of such profiles range from 50 to 70 mm, while their length (not shown in the drawing) typically ranges from 1 m to 4 m. Such hollow profiles can thus be considered to be elongated relative to their cross-sectional dimensions.

The hollow profile 1 comprises two force-transmission plates 2 arranged parallel to each other and a tube 3 arranged between said plates 2. Said tube 3 is integrally formed with the plates 2 and forms a hollow space 5 internally of the walls that define the tube 3. Two supports 6 that are arranged opposite one another are formed inside the hollow space 5, each one extending away from a respective plate 2. A measuring element 7 is shown by a dashed line forming a rectangle between these supports 6. Such a measuring element 7 is used for completing the WIM sensor centrally in the tube 3 under preload between the supports 6.

In this arrangement the measuring element 7 is shown diagrammatically; in reality it comprises a plurality of measuring elements, in particular of piezo-electric measuring elements. These are arranged equidistantly along the entire length of the hollow profile, centred between the supports 6, for example as plates 2 or as plate pairs 2 one on top of the other, as is also described in U.S. Pat. No. 5,461,924.

The tube 3 comprises two tube segments 8, with a wall thickness 9, which are designed to be mirror-symmetrical with respect to each other, which tube segments 8 join the plates 2 together and on the inside adjoin the hollow space 5.

The tube segments 8 are responsible for preloading the measuring element 7. Preloading is achieved by covering the measuring element 7. For this covering to be achievable in the first place in a stable manner, taking into account component tolerances, it needs to be of a certain magnitude. Nonetheless, the preload force must not be excessive. In order to achieve this, the wall thickness 9 of the tube segments 8 should be as thin as possible.

On the other hand, however, during loading of a WIM sensor very considerable mechanical load peaks are experienced, in particular in the transition region 12 of the tube segments 8. In the case of an insufficient wall thickness 9, these load peaks result in plastic deformation. This would result in a change in the measuring characteristics of the sensor, in the formation of cracks, and in failure of the sensor. Since this sensor is permanently installed in the surface of a road, and any replacement is associated with road closure lasting several hours, replacement of a WIM sensor is to be avoided in all circumstances.

Preloading the measuring element generates significant stress in the tubular part. Additional high stress in the tubular part is generated when heavy vehicles drive over the sensor in the installed state. Since this represents a dynamic load, and frequently high load cycles are experienced when vehicles drive over the device, the profile is subjected to permanent damage, in particular in the region of the transition from the tubular part to the force-transmission plates. It has been shown that conventional tubular profiles cannot withstand the operating loads of WIM applications. Since the tubular part forms a force shunt that reduces the sensitivity of the sensor and thus impairs the measuring results, said tubular part should be designed so as to be as thin-walled as possible and it should not be unnecessarily reinforced.

BRIEF SUMMARY OF THE INVENTION

It is the object of the present invention to state a hollow profile of the type mentioned in the introduction, which hollow profile withstands the loads experienced in use for a longer period of time without this diminishing the sensitivity of the completed WIM sensor. The object is met by the characteristics described below.

According to the invention the wall thickness of each tube segment has at least two relatively thin regions, and a relatively thick region between the aforesaid.

It has been shown that these relatively thin regions on the tube segments act in the manner of flexure hinges that permit bending in these regions more easily than do, in particular, relatively thick regions which have been stiffened by means of reinforcement of the wall thickness. Since, during bending, less stress is generated in relatively thin positions than in relatively thick positions, the service life of profiles according to the invention is longer when compared to conventional hollow profiles.

Further embodiments according to the invention are described in more detail below.

BRIEF DESCRIPTION OF THE DRAWINGS

Below, the invention is explained in more detail with reference to the drawings as follows.

DESCRIPTION OF EXEMPLARY EMBODIMENTS OF THE INVENTION

Figure 1:
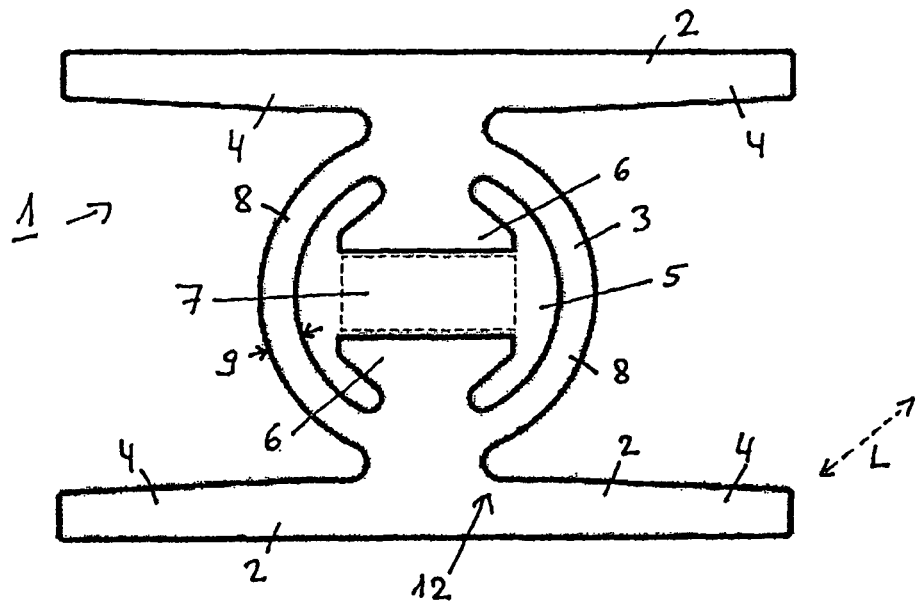
FIG. 1 a cross section of a WIM profile according to the state of the art.

Below, the invention is described in more detail with reference to the figures. The same circumstances have identical reference characters.

Figure 2:
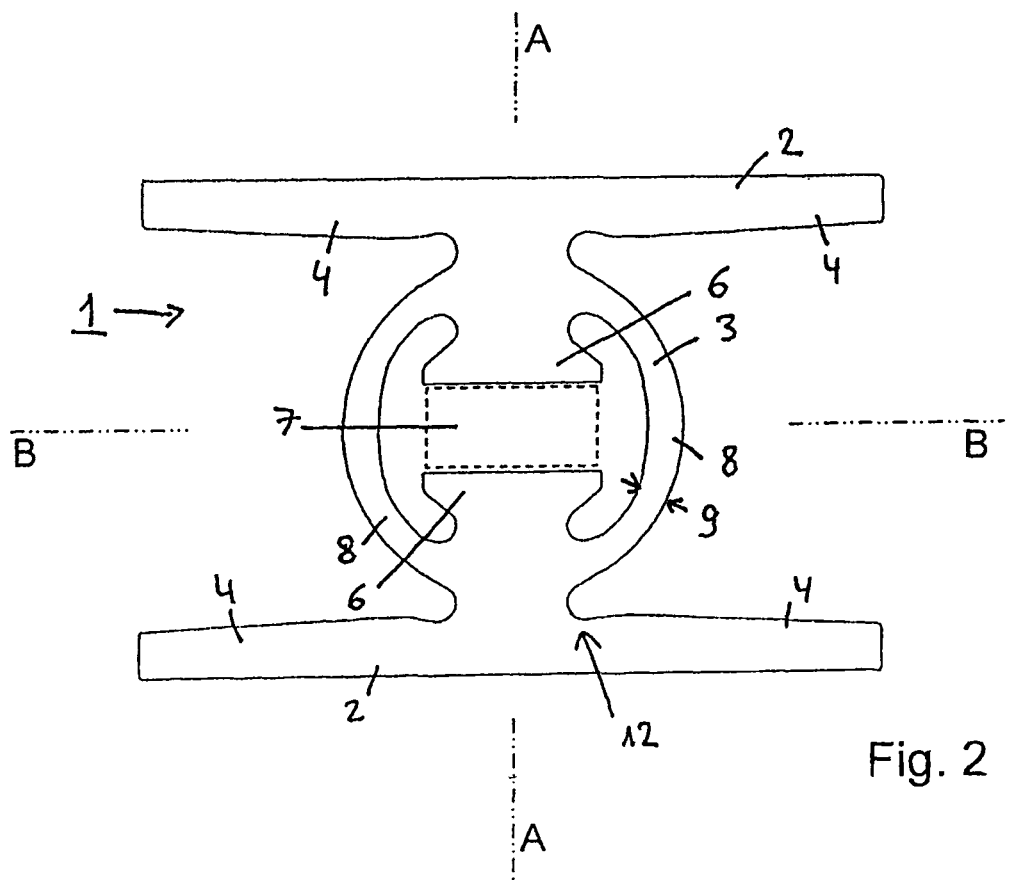
FIG. 2 a cross section of a WIM profile according to the invention.

FIG. 2 shows a cross section of a hollow profile 1 according to the invention, which hollow profile 1, apart from a few differences, is designed like the hollow profile according to the state of the art, which hollow profile has been described above. The components are essentially identical and are thus not listed anew.

In particular, in the embodiment according to the invention the parallel force-transmission plates 2 are wider, by a factor of 1.5 to 3 times, than the tube 3 arranged between the aforesaid. As a result of this a defined force transmission of a vehicle passing over the device is defined. Since the tube 3 is designed so as to be essentially round, the connection between the tube 3 and the force-transmission plates 2 is minimal when compared to the width of the force-transmission plates 2. This installation results in uniform force transmission to the measuring element 7 even if the force to be transmitted acts laterally on the force-transmission plate 2.

While the wall thickness 9 of the tube segments 8 according to the state of the art in FIG. 1 is constant, except for their regions near the plates 2, the wall thickness 9 of each of the walls that defines each of the tube segments 8 according to the invention is not constant in FIG. 2. In the embodiment according to the invention the wall thickness 9 of each tube segment 8 comprises at least two relatively thin regions 10 and between the aforesaid a relatively thick region 11, as shown in the enlarged detail of FIG. 3. As a result of a profile geometry matched in this manner the force shunt is minimal, even at maximum load, and the load peaks are below critical size.

In the embodiment according to the invention the cross section of the tube segments 8 has been changed to the effect that the load distribution is optimised. As a result of a bionic approach, small alterations are made to the profile, which alterations do, however, have a significant impact on the local stress of the material.

Figure 3:
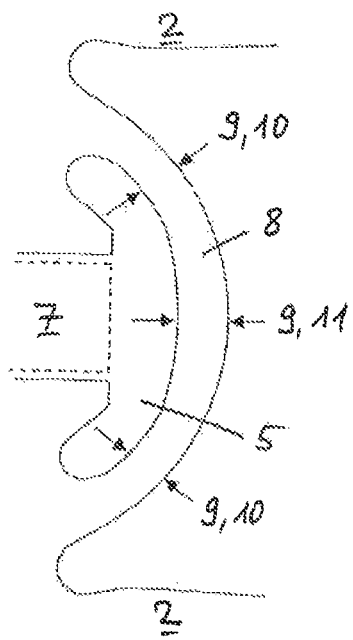
FIG. 3 a cross section of a tube segment according to the invention.

In a first preferred embodiment, shown in FIG. 3, the tube segments 8 instead of comprising a constant wall thickness 9 are designed so that at the height of the measuring element 7 they comprise a relatively thick region 11 and towards the force-transmission plates 2 taper off towards relatively thin regions 10. The relatively thick region 11 is reinforced and acts as a stay while the relatively thin regions 10 act as flexure hinges and are able to absorb the load peaks well without sustaining damage in this process. Preferably the wall thickness 9 of each of the tube segments 8 on each of the sides of each of the relatively thin regions 10 comprises a relatively thick region 11. During external force transmission perpendicularly to the parallel plates 2 the relatively thin regions 10 act as flexure hinges. If there is or are one or several measuring elements 7, clamped between the supports 6, the relatively thin regions 10 act as flexure hinges, which as a result of their elasticity apply preload to the measuring elements 7. To this effect every relatively thin region 10 should be designed as the local minimum, in which in each case the thinnest wall thickness 9 is formed at a point, wherein immediately on both sides of this point the wall thickness 9 increases again.

The tube segments 8 are essentially in the shape of circle segments. In each case it is important that the tube segments 8 do not extend parallel to each other but are curved, in other words extend in an arcuate shape, because it is only in this way that the relatively thin regions 10 become hinges. Otherwise, if the tube segments 8 were designed to be parallel to each other and essentially straight, the relatively thin regions 10 would only be stretched and compressed, rather than bent like a hinge.

Figure 4:
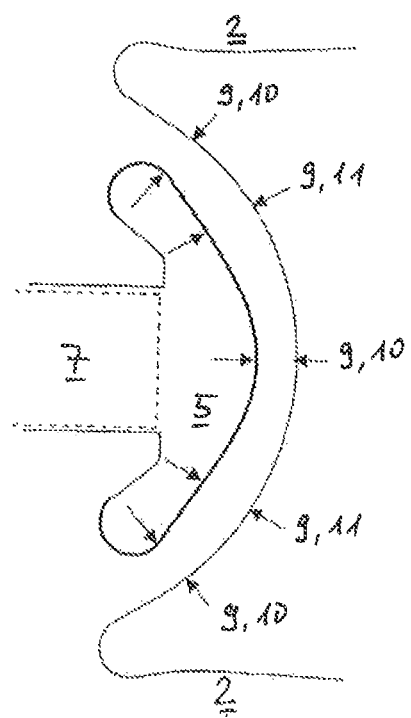
FIG. 4 a cross section of a tube segment according to the invention in an alternative embodiment.

In a second preferred embodiment, shown in FIG. 4, the tube segments 8 are designed so that the wall thickness has three relatively thin regions 10 and two relatively thick regions 11 therebetween. This results in two relatively rigid regions 11 which in each case on both sides adjoin flexure hinges on the relatively thin regions 10. Further relatively thin and relatively thick regions 10, 11, respectively, that are arranged alternately are also contemplated.

According to the invention as shown in FIG. 2 for example, the tube segments 8 are mirror-symmetrical relative to a plane B that extends parallel to the plates 2, centrally through the tube 2. This ensures uniform application of load to the measuring element 7 that will be inserted later.

In particular, the cross section of the hollow profile 1 according to the invention is constant along the entire length L of the hollow profile 1.

Figure 5:
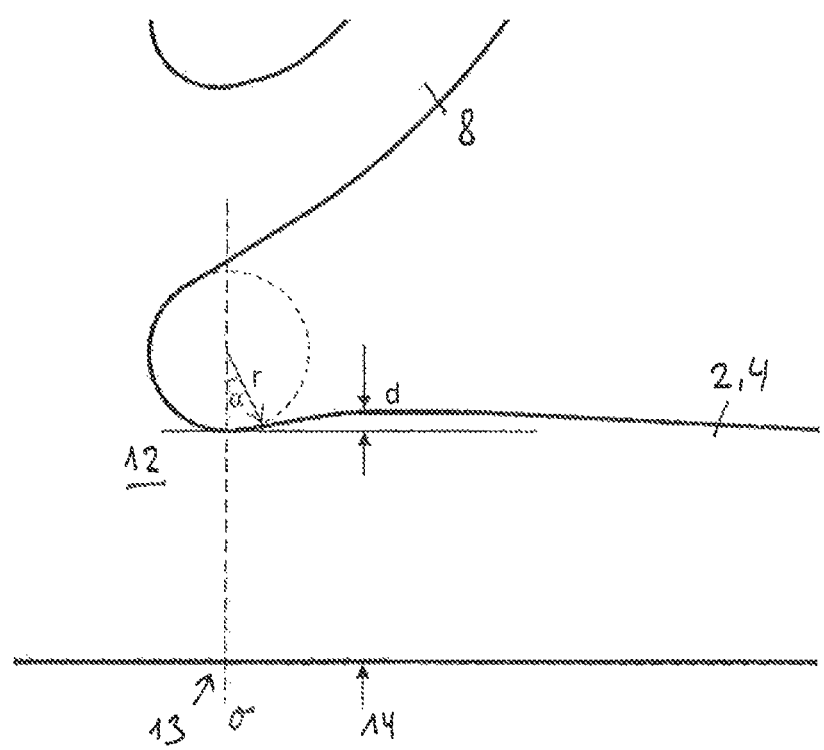
FIG. 5 the outer transition region between a tube segment and a force-transmission plate in an embodiment according to the invention.

FIG. 5 shows a further preferred embodiment of the hollow profile 1 according to the invention. In this design the transition radius from the tube segment 8 to the force-transmission plate 2 is designed so that it does not make a tangential transition to the transmission plate 2, as was the case in prior art. In the embodiment according to the invention in each case the outer transition region 12 between the tube segments 8 and the plates 2 is to be provided with an inner radius r, wherein in each case the inner radius r in the transition region 12 of the transmission plate 2 is designed to be wider by an angle α than it is orthogonally to the transmission plate 2 alignment. A corresponding orthogonal O is shown in a dashed line in FIG. 5. Consequently the material thickness of the force-transmission plate 2 increases from the direction of the orthogonal O towards the outside. Thus in each case the cross sections of the plates 2 in the outer transition regions 12 towards the tube segments 8 comprise a local minimum 13, and following towards the outside in one position 14 are designed so as to be thicker by a thickness d.

Figure 6:
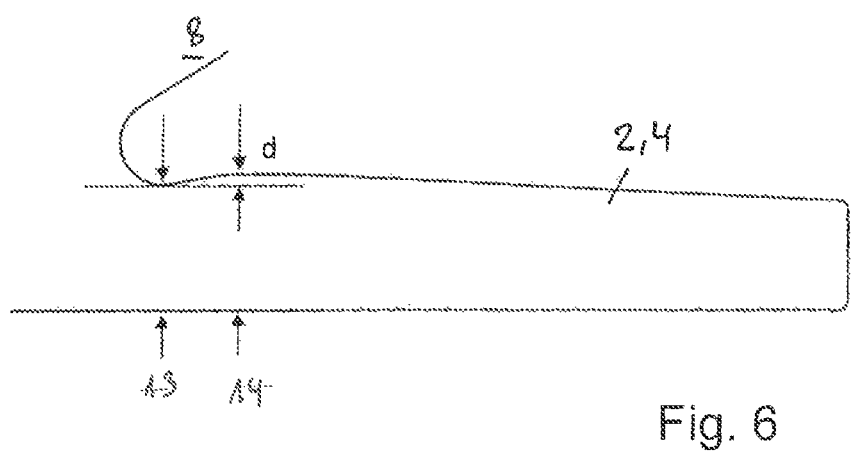
FIG. 6 a segment of a force-transmission plate according to the invention.

At these positions 14 the cross sections of the force-transmission plates 2 comprise a local maximum 14, from where they taper off towards the outside as illustrated in FIG. 6.

According to the invention the hollow profile 1 is mirror-symmetrical with respect to a centre plane A extending perpendicularly to the transmission plates 2, and/or with respect to a centre plane B extending parallel to the transmission plates 2. The stated planes A, B are indicated in FIG. 2. These symmetries not only facilitate production of a profile 1, but also prevent asymmetrical loads acting on a measuring element 7 inserted at a later stage into the hollow body 2.

In a further hollow profile according to the invention, said hollow profile already comprises the measuring element 7 that is received centrally between the supports 6 under preload, as shown by a dashed line forming a rectangle in FIG. 2.

It has been shown that a hollow profile 1 according to the invention provides advantages already if the wall thickness 9 of the tube segments 8 comprises at least one relatively thin region 10 with a local punctiform minimum, wherein the wall thickness 9 on both sides of this local minimum immediately increases when this minimum is arranged so as to be closer to a first force-transmission plate 2. Therefore, if there is only one minimum, the latter must not be in the middle between the plates. Such a hollow profile should then be installed in the road in such a manner that this first force-transmission plate 2 is situated in a road so that it faces upwards towards the road surface. Apart from the local relatively thin regions 10 of the tube segments 8 they have a constant and homogeneous wall thickness 9. Other preferred embodiments that have been described in the context of two or several relatively thin regions 10 can also be used with only one relatively thin region 10 that is arranged so as to be closer to a first force-transmission plate 2, as described.

In particular, the measuring element 7 can comprise a plurality of measuring elements 7 as described in U.S. Pat. No. 5,461,924, which measuring elements 7 are held under preload between the supports 6. In this arrangement, as a result of the insertion of the measuring elements 7, the relatively thin regions 10 of the tube segments 8 are extended as a result of bending open, and consequently the preload is applied. During bending open, the relatively thin regions 10 that act as flexure hinges generate a load that acts on the measuring elements 7. This prevents bending of the preload from being distributed along the entire length of the tube segments 8. As a result of this measure the service life of the hollow profile 1 is prolonged.

As a result of the modifications, described in this document, when compared to a hollow profile according to the state of the art, the high stress under load, which occurs above all in the transition region 12 between the force-transmission plate 2 and the tube segment 8, is better distributed. Instead of a critical load peak that results in plastic deformation and crack formation, in the design according to the invention the stress is better distributed over the hollow profile and in particular better distributed over the tube segments 8 and is correspondingly reduced. Consequently the maximum permissible load of the sensor is greatly increased and the service life is prolonged.

LIST OF REFERENCE CHARACTERS

1 Hollow profile for a WIM sensor
2 Force-transmission plates; plates
3 Tube
4 Segment of a force-transmission plate; plate segment
5 Hollow space
6 Support
7 Measuring element
8 Tube segment
9 Wall thickness
10 Relatively thin region
11 Relatively thick region
12 Outer transition region
13 Local minimum
14 Position on the plate segment, local maximum
A Plane extending perpendicularly to the plates
B Plane extending parallel to the plates
L Length of the hollow profile
O Orthogonal
d Thickness
r Radius
α Angle

The invention claimed is:

1. An oblong hollow profile for a WIM (weigh in motion) sensor, comprising:
   two force-transmission plates arranged parallel to each other,
   a tube arranged between these plates is integrally formed with the plates and joins the plates together and forms a hollow space,
   two supports that are arranged opposite one another are formed inside the hollow space, each support extending away from a respective plate, the supports being configured for receiving between the supports a measuring element disposed centrally in the tube under preload,
   wherein the tube comprises two tube segments, each tube segment includes a wall that has a thickness, each tube segment is shaped to be mirror-symmetrical with respect to the other tube segment, the inside of each tube segment adjoins the hollow space, and wherein the wall thickness of each tube segment has at least two relatively thin regions and a relatively thick region between the two relatively thin regions.

2. The hollow profile according to claim 1, wherein the wall thickness of each of the tube segments on each side of each of the relatively thin regions comprises at least one relatively thick region.

3. The hollow profile according to claim 1, wherein every relatively thin region represents a local minimum of the wall thickness.

4. The hollow profile according to claim 1, wherein the relatively thin regions are configured and disposed to act as flexure hinges with respect to the parallel plates where external force transmission is applied perpendicularly to the parallel plates.

5. The hollow profile according claim 1, wherein if there is at least one measuring element clamped between the supports, the relatively thin regions are configured and disposed to act as flexure hinges, which as a result of their elasticity are configured and disposed to apply preload to the measuring elements.

6. The hollow profile according to claim 1, wherein the tube segments are essentially in the shape of circle segments.

7. The hollow profile according to claim 1, wherein the wall thickness of each of the tube segments has three relatively thin regions and a relatively thick region disposed between each two consecutive thin regions.

8. The hollow profile according to claim 1, wherein each of the tube segments is mirror-symmetrical relative to a plane B that extends parallel to the plates.

9. The hollow profile according to claim 1, wherein the cross section of the hollow profile is constant along the entire length L of the hollow profile.

10. An oblong hollow profile for a WIM (weigh in motion) sensor, comprising:
    a two force transmission plates arranged parallel to each other,
    a tube arranged between these plates is integrally formed with the plates and joins the plates together and forms a hollow space,
    two supports that are arranged opposite one another are formed inside the hollow space, each support extending away from a respective plate, the supports being configured for receiving between the supports a measuring element disposed centrally in the tube under preload,
    wherein the tube comprises two tube segments, each tube segment includes a wall that has a thickness, each tube segment is shaped to be mirror-symmetrical with respect to the other tube segment, the inside of each type segment adjoins the hollow space, and wherein the wall thickness of each tube segment has at least two relatively thin regions and a relatively thick region between the two relatively thin regions; and
    wherein an outer transition region is defined where a respective tube segment joins integrally with a respective one of the plates and the outer transition region between the respective tube segment and the respective plate is provided with an inner radius that is wider by an angle $\alpha$ than it is orthogonally to the plate alignment.

11. The hollow profile according to claim 10, wherein the cross section of the respective plate in the outer transition region to the respective tube segment defines a local minimum, and following towards the outside in one position increases by a thickness d.

12. The hollow profile according to claim 11, wherein near the respective outer transition region the cross section of the respective force-transmission plate defines a local maximum, from where the respective force-transmission plate tapers off towards the outside.

13. The hollow profile according to claim 1, wherein the hollow profile is mirror-symmetrical with respect to a centre plane A extending perpendicularly to the plates.

14. The hollow profile according to claim 1, wherein the hollow profile is mirror-symmetrical with respect to a centre plane B extending parallel to the plates.

15. The hollow profile according to claim 1, further comprising a measuring element that is received centrally between the supports under preload.

16. The hollow profile according to claim 15, further comprising a plurality of measuring elements are held under preload between the supports, wherein the relatively thin regions of the tube segments are extended as a result of bending open so as to apply the preload to the plurality of measuring elements.

17. An oblong hollow profile for a weigh-in-motion sensor, comprising a first force-transmission plate and a second force-transmission plate arranged parallel to the first force-transmission plate,
    a tube arranged between these plates and integrally formed with the plates and defining a hollow space, wherein two supports that are arranged opposite one another are formed inside the hollow space, each one of the respective supports extending away from a respective one of the plates, the supports being configured for receiving between the supports a measuring element disposed centrally in the tube under preload, and
    wherein the tube comprises two tube segments that are mirror-symmetrical with respect to each other and which join the plates together and on the inside adjoin the hollow space, wherein each tube segment defines a wall having a wall thickness and the wall thickness of each tube segment has at least one relatively thin region with a local minimum, wherein the wall thickness on both opposite sides of this local minimum immediately increases, and wherein this minimum is arranged so as to be closer to the first force-transmission plate.

18. The hollow profile according to claim 17, wherein the first force-transmission plate is to be installed in a road facing upwards towards the road surface.

19. The hollow profile according to claim 17, wherein apart from the local relatively thin regions the wall thickness of each tube segment has a constant and homogeneous wall thickness.

20. The hollow profile according to claim 1, wherein apart from the local relatively thin regions, the wall thickness of each tube segment has a constant and homogeneous wall thickness.

* * * * *